Oct. 13, 1931.  H. F. TOWNER  1,827,125
DISK HARROW
Filed Feb. 14, 1928    2 Sheets-Sheet 1
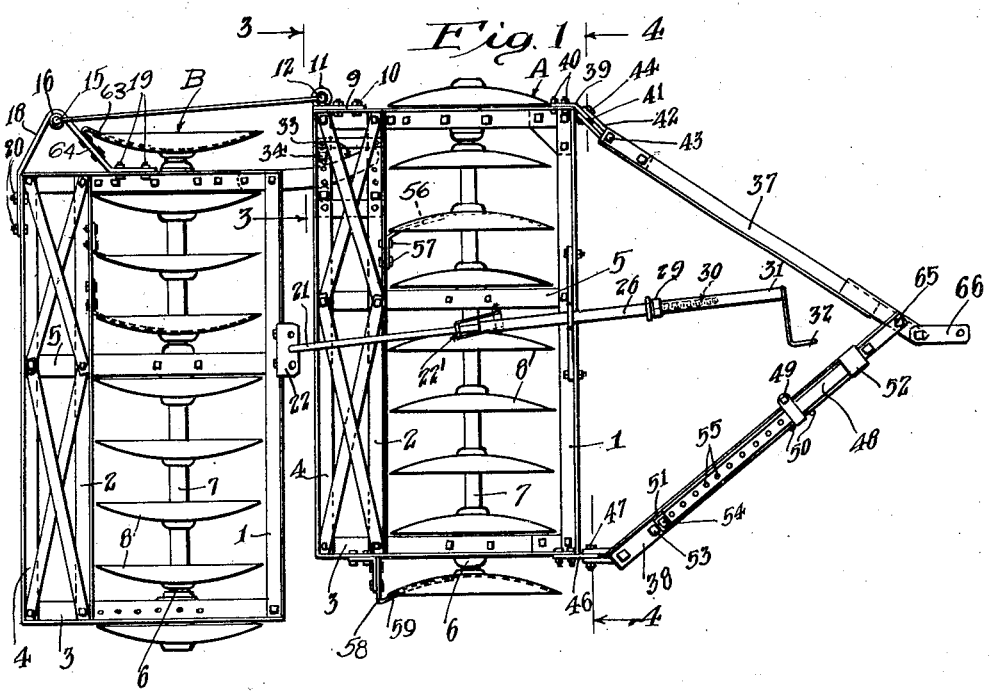
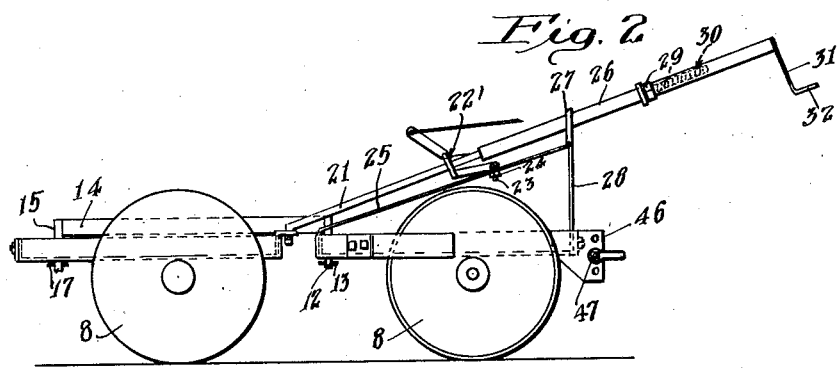
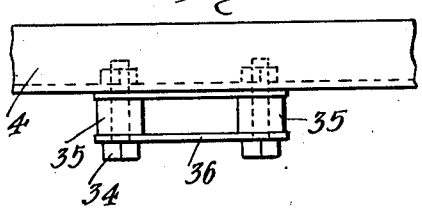
Inventor
Heber F. Towner
By Lyon & Lyon
Attorney

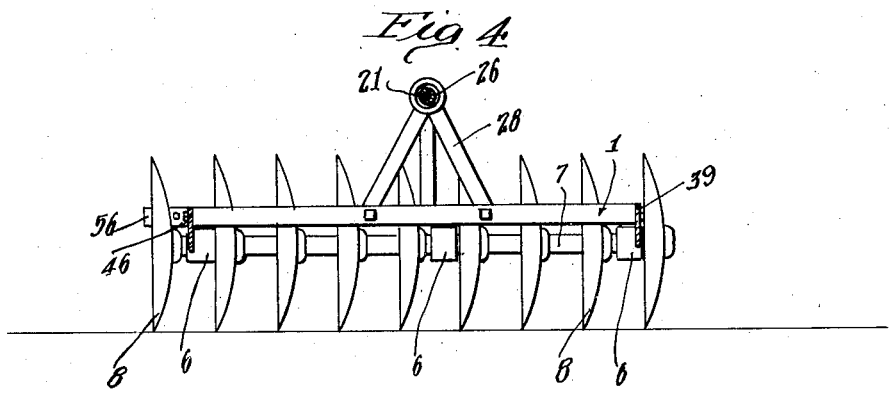
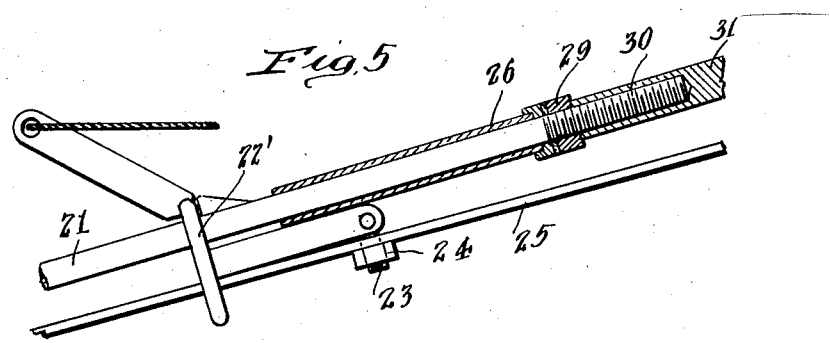

Patented Oct. 13, 1931

1,827,125

UNITED STATES PATENT OFFICE

HEBER FRED TOWNER, OF SANTA ANA, CALIFORNIA; P. G. BEISSEL, EXECUTOR OF SAID HEBER FRED TOWNER, DECEASED, ASSIGNOR TO B. V. CURRY, TRUSTEE

DISK HARROW

Application filed February 14, 1928. Serial No. 254,186.

This invention relates to disk harrows and is more particularly related to a disk harrow adapted to be drawn in offset relation from a tractor or other power engine.

The disk harrow embodying this invention is an improvement over the form of disk harrow described and claimed in the patent granted to me May 3, 1927, Patent No. 1,627,356, for disk cultivator.

In certain soil conditions the rear gang of a single tandem disk harrow is difficult to control. For instance, when it is desired to angle the gangs into working position, the rear gang upon being released will not fall back into its working angular position, but instead remains in its parallel non-working angular position. When the rear gang does assume its working angle, it does so temporarily, for it will soon return to a parallel non-working position.

It is the principal object of this invention to overcome the difficulty of controlling the rear gang of a single tandem disk harrow by so positioning the draft connection to the rear gang that the draft force exerted through the draft connection will create a turning moment of sufficient force to rotate the rear gang into its working angular position and to hold it there under normal operating conditions.

It is a further object to provide means for holding the two gangs of a single tandem disk harrow in parallel non-working position, which means are releasable at the will of the operator.

It is a further object to provide means by which the operator may govern the angular working position of the two gangs of a single tandem disk harrow.

It has heretofore been difficult to turn a single tandem disk harrow in a direction away from the pivoted end of the gangs when the gangs are in working position, or in other words, around the open end of the gangs. It is one of the objects of this invention to make it possible to turn a single tandem disk harrow around its open end by providing means which will allow the gangs to rotate into their parallel non-working position when turned around the open end of the gang, and to return the gangs to their predetermined working angular position when the harrow is again drawn forward.

Another object of this invention is to provide a disk harrow which includes a multiplicity of gangs of disks connected together in tandem relation and so connected together and to a draft means as to permit the disk harrow to be drawn to one side of the draft means.

Another object of this invention is to provide a disk harrow including a multiplicity of gangs of disks connected together in tandem relation, the forward gang being connected to the rearward gang at a point outside of the disks of the rearward gang so that the draft force will cause the rearward gang to assume its angular working position.

Another object of this invention is to provide a disk harrow adapted to be drawn by a power implement in offset relation to said power implement, the disk harrow being of relatively light construction to permit the same to be drawn with a minimum of power and through sand or sand-like soil and the disk harrow including a pair of gangs of disks connected together in tandem relation, the rear gang being connected to the forward gang so that the draft force acting through the connection will rotate the rear gang into its angular working position.

Another object of this invention is to provide a disk harrow including a pair of gangs of disks connected together in tandem relation and connecting means between said gangs, permitting the gangs to be angled to complementary working positions and providing means for permitting the harrow to be freely turned in either direction.

Another object of this invention is to provide a disk harrow including a pair of gangs of disks connected together in tandem relation, the connecting means between said gangs providing draft means for the rearward gang of disks which normally tend to pull said rearward gang to a greater working position than the working position of the forward gang, and means independent of said draft means connecting the rear gang to the forward gang and providing means for maintaining the rear gang in complementary working position with the forward gang.

Another object of this invention is to provide a disk harrow including a multiplicity of gangs of disks connected in tandem relation and including draft means to the rearward gang by means of which the said gangs are pivotally connected together, and means connecting the rear gang of disks to the forward gang of disks which means are expansible to permit the gangs to be angled to a working position and provide means for maintaining the disk of the rearward gang from tracking in the furrows formed by the disks of the forward gang and also provide means for closing the rearward gang toward the forward gang when the harrow is turned to the right.

Other objects and advantages of this invention it is believed will be apparent from the following detailed description of a preferred embodiment thereof, as illustrated in the accompanying drawings.

In the drawings:

Figure 1 is a top plan view of a disk harrow embodying this invention.

Figure 2 is a side elevation thereof.

Figure 3 is a fragmental sectional end view taken substantially on the line 3—3 of Figure 1.

Figure 4 is a front elevation taken substantially on the line 4—4 of Figure 1.

Figure 5 is a fragmental view of the pitch adjusting means embodied in this invention.

In the preferred embodiment of this invention illustrated in the accompanying drawings, A indicates a forward gang of disks and B a rearward gang of disks. The gangs of disks A and B are connected together in tandem relation in a manner to permit the disk harrow formed by the gangs A and B to be drawn in offset relation relative to a draft implement such, for example, as a tractor or the like without imposing upon the tractor or the like any material side draft which would prevent the free manipulation and turning of the said draft implement.

The gangs of disks A and B are preferably of substantially the same construction and include frames formed of frame members 1 and 2 which are connected together at their ends by means of end angle irons 3. The angle irons 3 extend beyond the frame members 2 and are secured to rear angle irons 4 which, together with the frame members 2, provide weight boxes into which weights may be positioned for determining the depth of penetration of the disks of the gangs A and B. An intermediate frame brace 5 is provided which is secured to the frame members 1 and 2 and weight box angle iron 4.

Mounted in each of the frames in bearings 6 is a shaft 7 to which concavo-convex disks 8 are secured in any suitable or desirable manner, as is well understood in the art. The disks 8 of the forward gang are concaved toward the right side of the disk harrow and the disks 8 of the rearward gang are concaved toward the left side of the disk harrow.

Means are provided for connecting the gangs A and B together to permit the gangs to be angled to the working position, which means preferably include a plate 9 secured to the left hand frame member 3 of the frame of the forward gang A by means of bolts 10. Secured to the plate 9 in any suitable or desirable manner such, for example, as welding the same in position, is a tubular member 11 into which a pin 12 is adapted to fit. The pin 12 is held in position by any suitable or desirable means to permit the pin 12 to freely rotate, which means may comprise a rod 13 passed transversely through the lower end of the pin 12. The pin 12 is secured to the end of a connecting rod 14 which extends rearwardly of the harrow and is provided with a pin 15 similar to the pin 12 at its rearward end. The pin 15 fits within a tubular member 16 in a manner to permit the same to rotate freely and is held in position by means of a rod 17 similar to the rod 13. The tubular member 16 is secured to a bracket 18 by any suitable or desirable means such as welding the tubular member in position. The bracket 18 is secured to the frame of the rearward gang B by being secured to the left hand frame member 3, as illustrated at 19, and to the weight box angle iron 4, as indicated at 20. The pins 12 and 15 are located outside of the disk 8 of the rearward gang B. The connecting rod 14 by means of which the gang A is connected with the gang B operates to pull the gang B from the rear or to push the gang B ahead permitting the gang B to tend to rotate around the pin 15 away from the gang A.

In order to hold the gang B in proper working position relative to the gang A when the gang A is angled to a working position in a manner which will hereinafter be described, a bar 21 is provided which is pivotally secured to the forward frame member 1 of the rearward gang at a plate bracket 22 and is adjustably secured at its opposite end to the frame of the forward gang A. The rod 21 passes through a yoke 22' which is pivotally supported on a pin 23 secured to a bolt 24. The bolt 24 passes through the web of an angle iron 25 secured to the frame of the gang A and is free to pivot to permit the yoke 22' to pivot in a horizontal plane. The rod 21 is provided with a sleeve 26 which passes through a ring 27 secured to a standard 28. The standard 28 is secured to the forward frame member 1 of the frame of the gang A. The sleeve 26 fits loosely within the ring 27 to permit the rod 21 and sleeve 26 to swing laterally within the ring 27. The sleeve 26 is secured at its forward end to a bolt 29 which is screw-threaded to the threads 30 formed on the forward end of the rod 21. A crank 31 is secured to the nut 29 and the crank handle 32 is positioned forwardly of the harrow a distance sufficient to permit the operator of the tractor or power implement which is drawing the harrow to reach down from the seat of the tractor or power implement and adjust the working angles of the gangs A and B.

Means are provided for maintaining the disks 8 of the rearward gang from tracking in the furrow formed by the disks 8 of the forward gang and also for causing the rearward gang B to fold up on the forward gang A when the disk harrow is turned toward the right, which means preferably comprise an arcuate holding arm 33 which is secured to the corner of the frame of the gang B, as illustrated at 34, and extends between rollers 35 mounted between plates 36 secured to the hold-down box channel iron 4 of the frame of the forward gang A. The rollers 35 are spaced apart a distance substantially equal to the width of the arcuate holding bar 33. The arcuate holding bar 33 bearing against the rollers 35 at its opposite edges prevents the disks 8 of the rearward gang B from moving transversely in relation to the forward gang A and thereby holds the disks 8 in their respective adjusted positions substantially intermediate the disks 8 of the forward gang B seeking the path of least resistance to their travel, which is in the furrows formed by the disks 8 of the forward gang A.

The adjustable draft hitch preferably comprises angle irons 37 and 38 which are pivotally secured at or near the respective corners of the frame of the forward gang A. The angle iron 37 is secured to a plate 39 secured to the frame of the forward gang, as illustrated at 40. The plate 39 is bent to provide a portion 41 which extends substantially parallel to the angle iron 37. A clevis 42 is pivotally secured at the end of the angle iron 37 by means of a bolt 43 and is pivotally secured by means of a bolt 44 to the angled portion 41 of the plate 39. The bolt 44 may be passed through any one of a series of holes 45 formed in vertical relation in the angled portion 41 of the plate 39 in order to adjust the height at which the angle iron 37 of the hitch is secured to the disk harrow. The bolt 44 is preferably located at a high point in order to pull this end of the forward gang down into the ground against the normal tendency exerted in such disk harrows for the end, from which the disks 8 are concaved, to ride out of the ground. A similar adjustable connecting means 46 is provided for connecting the angle iron 38 to the opposite corner of the frame of the gang A and the bolt 47 of this connecting mechanism is preferably secured at a low point in order to overcome the tendency of the disks 8 at this corner of the forward gang to run into the ground. Mounted within the angle iron 38 is a smaller angle iron 48 which is longitudinally slidable relative to the angle iron 38. A clamp 49 is secured to the angle iron 38 in position to clamp the angle iron 48 to the angle iron 38 after the length of this arm of the hitch has been adjusted in order to adjust the offset relation of the disk harrow to the line of draft of the draft implement. The clamp 49 is secured to the angle iron 48 by being positioned between abutments 50 formed on the transverse web of the angle iron 38. In order to provide a closed slide for the angle iron 48 within the angle iron 38, a short portion of angle iron 51 of the same size as the angle iron 38 is turned over and slotted at its ends to the webs of the angle iron 38 at its forward end. A similar stop means 52 is provided at the rear end of the angle iron 48. A bolt 53 is passed through the transverse web of the angle iron 38 to provide a rearward stop for the angle iron 48. A bolt 54 is passed through the member 52 in position to engage the bolt 53. The bolt 53 may be passed through any one of a series of holes 55 formed in the transverse web of the angle iron 38. The angle iron 48 is pivotally secured to the angle iron 37 by means of a bolt 65. A hitch clevis 66 is pivotally secured to the end of the angle iron 37.

Means are provided for scraping the disks 8 to prevent the same from accumulating soil, mud, or the like, which means preferably comprise blades 56 which are secured to the frame members 2, as indicated at 57, and provide arcuate scraping blades adapted to closely fit the inner peripheries of the concavo-convex disks.

In order to prevent the outer disks of the gangs A and B from throwing the cultivated soil beyond the furrows formed by the disks of the disk harrow, a frame portion 58 is built out beyond the frame of the gang A in position to carry a scraper blade 59 similar to the scraper blades 56. The scraper blade 59 extends at an angle toward the end disk 8 in order to prevent this end disk 8 from throwing too far the soil it cultivates. A blade 63 similar to the blade 56 is provided at the left end of the gang B in position to scrape the inner periphery of the end disk 8 to prevent this disk from throwing the soil it cultivates beyond the furrow formed by the end disk of the forward gang A. The plate 63 is secured to the bracket 18, as indicated at 64.

The arcuate arm 33 provides means for holding the gangs A and B substantially horizontally rigid and acts to overcome the tendency of the driving force exerted through the pivot pin 15 to lower the forward end of the frame of the rearward gang B and this tendency being actuated through the arcuate arm 33 tends also to overcome the tendency of the rearward end of the forward gang A to rise from the ground, thereby equalizing the working positions of the gangs A and B.

Having fully described my invention, it is to be understood that I do not wish to be limited to the details herein set forth, but my invention is of the full scope of the appended claims.

I claim:

1. In a single tandem disk harrow, the combination of a forward gang of disks and a rearward gang of disks, the disks of the forward gang being positioned therein opposed to the positioning of the disks of the rearward gang, a hinge connection at one end of the harrow including a bar and means for pivotally connecting the respective ends of the bar to the front and rear gangs, an arcuate holding arm secured to one of said gangs, means for slidably connecting the said holding arm to the other gang, means for adjusting the angular relation of said gangs. a pair of longitudinally extensible rigid draft arms secured to the forward gang, and means for connecting the said draft connections with a draft clevis.

2. In a single tandem disk harrow, the combination of a forward gang of disks and a rearward gang of disks, the disks of the forward gang being positioned therein opposed to the positioning of the disks in the rearward gang, a hinge means for connecting the gangs together, means for connecting the gangs together to permit the same to swing apart to a working position, and an arcuate holding arm secured to one gang and slidably secured to the other gang, and means for adjusting the angular relation of said gangs.

3. In a single tandem disk harrow, the combination of a forward gang of disks and a rearward gang of disks, the disks of the forward gang being positioned therein opposite to the position of the disks in the rearward gang, a hinge means for connecting the gangs together, means pivotally connecting the gangs together to permit the same to swing to working position, means for holding the gangs of disks in proper cutting relation, means for locking the respective gangs in parallel non-working position, means for releasing said locking means, and means for adjustably limiting the working angle of said gangs but not preventing said gangs from returning to their parallel non-working relation, whereby the gangs will angle to a predetermined working angle when the harrow is drawn forward, and will allow the gangs to return to their parallel non-working position when the harrow is turned in a direction away from the pivoted end of the gangs.

4. In a single tandem disk harrow, the combination of a forward gang of disks and a rearward gang of disks, the disks of the forward gang being positioned therein opposite to the position of the disks in the rearward gang, a hinge means for connecting the gangs together, means pivotally connecting the gangs together to permit the same to swing to working position, means for holding the gangs of disks in proper cutting relation, and means for adjustably limiting the working angle of said gangs but not preventing said gangs from returning to their parallel non-working relation, whereby the gangs will angle to a predetermined working angle when the harrow is drawn forward, and will allow the gangs to return to their parallel non-working position when the harrow is turned in a direction away from the pivoted end of the gangs.

5. In a single tandem disk harrow, the combination of a forward frame, a gang of disks rotatably mounted in said forward frame, a draft device adapted to connect said forward frame to a draft implement, a rearward frame in tandem relation with said forward frame, a gang of disks rotatably mounted in said rearward frame in opposite relation to the gang mounted in said forward frame, a hinged draft means connecting one end of the forward frame to one end of the rearward frame at a point which will enable the draft force exerted through said hinged draft means to rotate said rear frame into angular working position, means for holding said forward and rearward frames and gangs from shifting laterally from a predetermined setting, a releasable means spaced from said hinge means for pivotally connecting said forward and rearward frames, a locking means for said releasable means for locking the frames in parallel non-working position, means for releasing said locking means, means for controlling the working angle of said gangs, said means being arranged to automatically allow the gangs to return to their parallel non-working position when said harrow is turned toward the open end of the gangs and to automatically return to their predetermined working angle when the harrow is again drawn forward.

6. In a single tandem disk harrow, the combination of a forward frame, a gang of disks rotatably mounted in said forward frame, a draft device adapted to connect said forward frame to a draft implement, a rearward frame in tandem relation with said forward frame, a gang of disks rotatably mounted in said rearward frame in opposite relation to the gang mounted in said forward frame, a hinged draft means connecting one end of the forward frame to one end of the rearward frame at a point which will enable the draft force exerted through said hinged draft means to rotate said rear frame into angular working position, means for holding said forward and rearward frames and gangs from shifting laterally from a predetermined setting, a releasable means spaced from said hinge means for pivotally connecting said forward and rearward frame, a locking means for said releasable means for adjustably controlling the working angle of said gangs, said last named means being arranged to automatically allow the gangs to return to their parallel non-working position when the harrow is turned toward the open end of the gangs and to automatically return to their predetermined working angle when the harrow is again drawn forward.

7. In a single tandem disk harrow, the combination of a forward frame, a gang of disks rotatably mounted in said forward frame, a draft device adapted to connect said forward frame to a draft implement, a rearward frame in tandem relation with said forward frame, a gang of disks rotatably mounted in said rearward frame in opposite relation to the gang mounted in said forward frame, a hinged draft means connecting one end of the forward frame to one end of the rearward frame at a point which will enable the draft force exerted through said hinge draft means to rotate said rear frame into angular working position, means for holding said forward and rearward frames and gangs from shifting laterally from a predetermined setting, a releasable means spaced from said hinge means for interconnecting said frames, a locking means associated therewith for locking the frames in parallel non-working relation, means for releasing said locking means, means for controlling the working angular relation of the gangs, said means being arranged to automatically allow the gangs to return to their parallel non-working relation when said harrow is turned toward the open end of the gangs and to automatically return to their predetermined working angle when the harrow is again drawn forward.

8. In a single tandem disk harrow, the combination of a forward gang of disks, a draft device adapted to connect said forward gang of disks to a draft means, a rear gang of disks, a hinged draft connection between said forward and rear gangs, the said draft connection to said rear gang being connected to said rear gang at a point at which the draft force will produce a turning moment which will force the rear gang to assume its working angle, an arcuate holding bar attached to the rear gang and slidably guided within said forward gang, a releasable means spaced from said hinge means for pivotally connecting said gangs, and means associated therewith for adjusting the angular relation of said gangs.

9. In a single tandem disk harrow, the combination of a forward gang of disks, a draft device adapted to connect said forward gang of disks to a draft means, a rear gang of disks, the disks of the rearward gang being positioned therein opposite to the positioning of the disks of the forward gang, a draft connecting means pivotally connecting said forward and rearward gangs, said draft connecting means being pivotally attached to said rear gang at a point to the rear of the disks of said gang and beyond the end thereof, whereby the draft force will create a turning moment about the point at which the rear disk gang pivots with the ground to rotate said rear gang into working angle, an arcuate bar secured to one of said gangs, means for slidably connecting the said arcuate bar to the other gang, and a releasable means pivotally connecting said forward and rearward gangs in spaced relation to said draft connecting means for controlling the working angle of said gangs.

10. In a single tandem disk harrow, the combination of a forward gang of disks, a draft device adapted to connect said forward gang of disks to a draft means, a rear gang of disks, the disks of the rearward gang being positioned therein opposite to the positioning of the disks of the forward gang, a hinged draft connecting means pivotally connecting said forward and rearward gangs, said draft connecting means being pivotally attached to said rear gang at a point whereat the draft force will rotate said rearward gang into a working angle, an arcuate bar secured to one of said gangs, means for slidably connecting the said arcuate bar to the other gang, and a releasable means pivotally connecting said forward and rearward gangs in spaced relation to said draft connecting means for controlling the working angle of said gangs.

11. In a single tandem disk harrow, the combination of a forward frame, a gang of disks rotatably mounted therein, means adapted to connect said forward frame with a draft means, a rearward frame, a gang of disks rotatably mounted therein and positioned opposite to the mounting of the disks of the forward gang, a bracket attached to the rear corner of the rearward frame and extending beyond the outer disk of the said rear disk gang, a link pivotally connecting said forward frame to said bracket whereby the draft force transmitted through said link rotates said rear frame into its working angle, an arcuate bar secured to one of said gangs, means for slidably connecting the said arcuate bar to the other gang, and an adjustable means connecting said forward and rearward frames for controlling the working angle of said gangs.

12. In a single tandem disk harrow, the combination of a forward frame, a gang of disks rotatably mounted therein, means adapted to connect said forward frame with a draft means, a rearward frame, a gang of disks rotatably mounted therein and positioned opposite to the mounting of the disks of the forward gang, a bracket attached to the rear corner of the rearward frame and extending beyond the outer disk of the said rear disk gang, a link pivotally connecting said forward frame to said bracket whereby the draft force transmitted through said link rotates said rear frame into its working angle, an arcuate bar secured to one of said gangs, means for slidably connecting the said arcuate bar to the other gang, and means for locking the respective gangs in parallel non-working position, means for releasing said locking means, and means for adjustably limiting the working angle of said gangs but not preventing said gangs from returning to their parallel non-working relation whereby the gangs will angle to a predetermined working angle when the harrow is drawn forward and will allow the gangs to return to their parallel non-working position when the harrow is turned in a direction away fram the pivoted end of the gangs.

Signed at Santa Ana, California, this 2nd day of February, 1928.

HEBER FRED TOWNER.